Figure 1A:
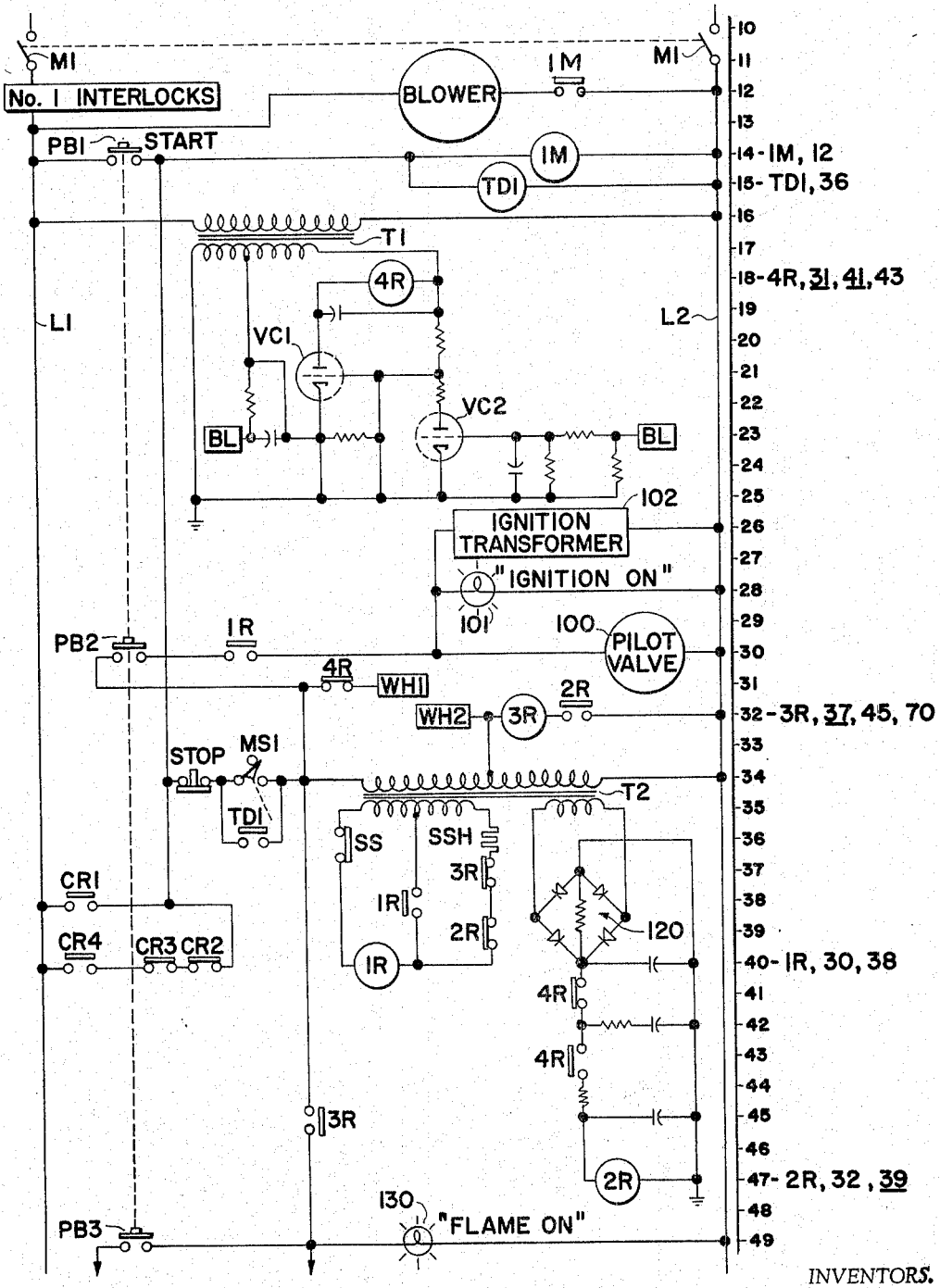

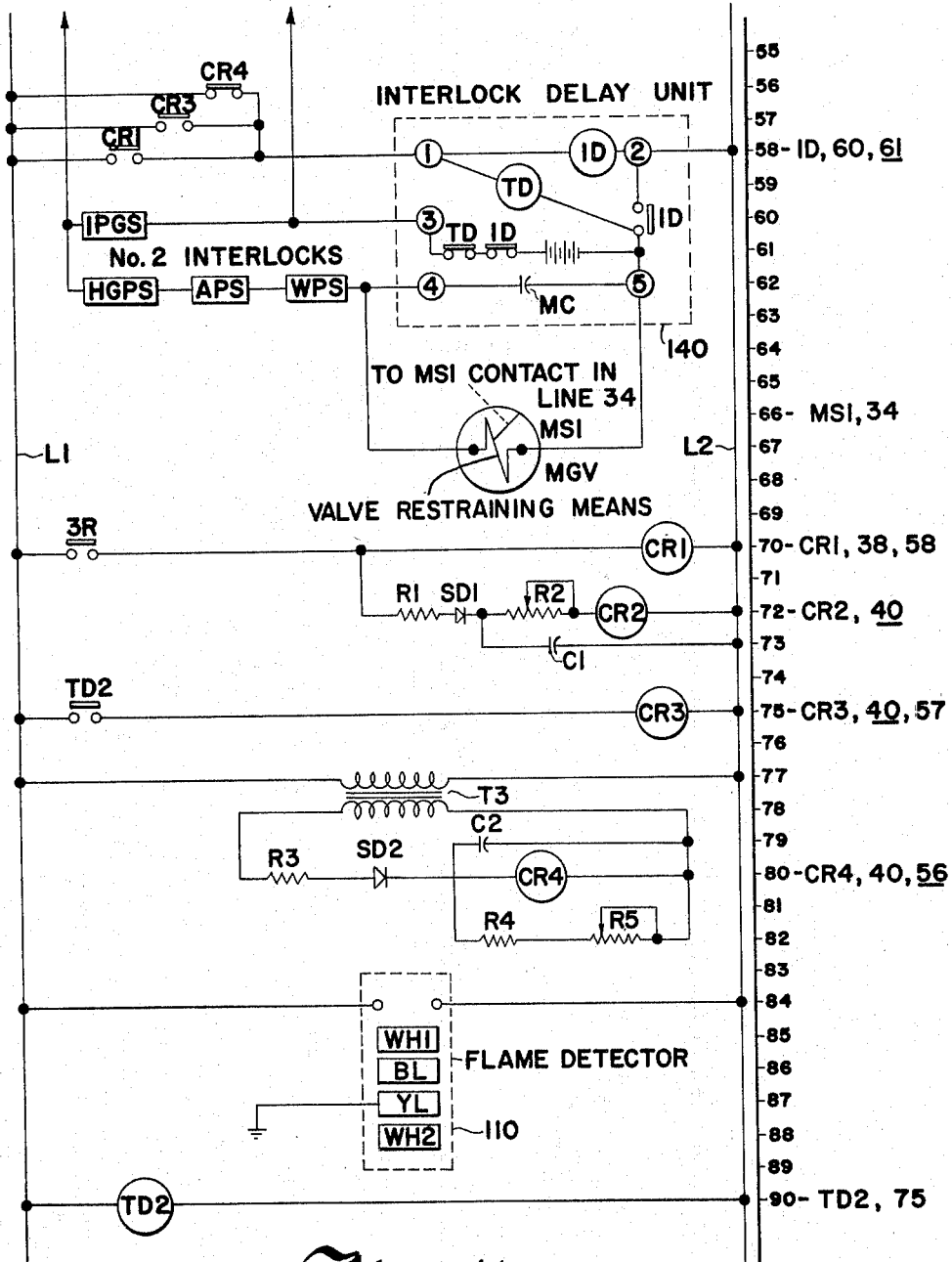

United States Patent Office 3,263,731
Patented August 2, 1966

3,263,731
CONTROL APPARATUS FOR COMBUSTION EQUIPMENT
Ralph Hanna and James A. Huber, Toledo, Ohio, assignors to Midland-Ross Corporation, Toledo, Ohio, a corporation of Ohio
Filed June 14, 1965, Ser. No. 463,501
19 Claims. (Cl. 158—28)

This invention relates to control apparatus for combustion equipment in general and, in particular, to methods and means for safely controlling the operation of combustion equipment and for avoiding repeated shutdowns of such combustion equipment as a result of nuisance power failures, while still maintaining a safe operation of said equipment through the proper interlocks.

In recent years there have evolved many combustion safeguards to provide for safe operation of any type of combustion equipment. The main function of any combustion safeguard is to prevent continued flow of unignited fuel into the combustion space in the event of flame failure, failure of ignition or power failure to the controlling system. An additional function often essential to safety is the prevention of any attempt to start the burner until expiration of a measuured time interval during which the combustion space may be thoroughly purged of any possible accumulation of fuel (resulting from valve leakage) or of volatile products in the process. Supplementary functions such as limit switch interlock, or actuating an alarm on flame failure or limit shutdown, may be important for safety, or for economy, efficiency, and convenience.

A safeguard system should also incorporate adequate protection against hazards resulting from abnormal conditions that would prevent a flame detection means from functioning properly. This requires provision for continuous or periodic safe-checking of the safeguard system, with automatic shutdown or prevention of startup in the event of abnormalities that would prevent the system from discriminating between the presence and the absence of flame. Normally such flame detection systems are designed to include fail safe features. That is, when electrical components within the detecting system fail, then the system gives a readout as if the flame is not present, thus preventing the system from functioning further. In thus designing the systems, however, the reaction of the systems to nuisance power failures is the same as if a component within the detecting system had failed. In the case of a prolonged power failure it is desirable that the equipment be completely shutdown and restarted only after the reasons for the power failure have been ascertained or, if operating from a municipal supply for example, waiting until the power has been restored. However, even nuisance power failures, on the order of seven seconds or less, will also cause this type of safety equipment to shut the combustion apparatus down. This is not desirable.

Accordingly, it is an object of this invention to provide improved control apparatus for combustion equipment or the like.

It is a further object of this invention to provide improved control apparatus for combustion equipment or the like which is capable of dealing with nuisance power failures without interrupting the normal functioning of the equipment.

It is a further object of this invention to provide control apparatus for combustion equipment or the like which will maintain combustion in a furnace during a nuisance power failure and will restore the safeguard checking equipment to flame detection operation after the resumption of power.

There are several types of flame detection equipment commercially available and the invention will be described herein with reference to two of the types available although the invention is equally applicable to any other type of sensing means.

The first type of sensing device is commonly called a rectifying flame rod. Although the flame rod will not be dealt with in detail, it will be noted that the rectifying action of a flame electrode depends first of all upon the fact that the chemical action of combustion results in ionizing some of the molecules of gas. The presence of these electrically charged particles enables the flame to conduct a current between two electrodes in contact with the flame. The second fact on which rectification by means of a flame electrode depends is that current will flow more readily in one direction than the other if one electrode surface is larger than the other. Thus if a flame rod and a burner are being used as two electrodes their sizes may be properly proportioned and electronic components may be used in connection therewith which will detect the presence or absence of a flame between the burner and the flame rod.

A second type of detector is an electronic detector that senses only ultraviolet radiation, present in any flame, and is completely unaffected by hot refractory. A self-checking feature may be built into this type of detector by the use of, for example, an oscillating shutter arrangement to operate in conjunction with the pulsing of a checking relay. In one commercially available model, this feature provides a complete check of the flame safeguard electrical operation approximately ninety times every minute and any component malfunction causes a safety shutdown within four seconds.

As noted hereinbefore however, the detecting circuits cannot be distinguished between a component failure and the abnormality created by a nuisance power failure so that combustion equipment will be completely shutdown in the event of a nuisance power failure.

Apparatus featuring the teachings of this invention includes control equipment for combustion apparatus or the like and comprises main valve means for controlling fuel flow to a combustion chamber and means for restraining the opening of the main valve means. Means responsive to a flame in the combustion chamber are utilized for producing a signal to disable the restraining means when a flame is present and for closing the main valve means when a flame is absent. Starting sequence means for the apparatus may include switching means and ignition means. The switching means is operable to connect a power supply means to the ignition means and to the flame responsive means. Means are further utilized which are responsive to failure for power supply means for connecting an alternative signal to maintain the restraining means disabled for a predetermined period after failure of the power supply. In addition, the invention includes means for reenergizing the flame responsive means in response to power resumption during the predetermined period set forth above.

More specifically, the features of this invention are set forth in an embodiment of control apparatus for combustion equipment and the like which includes the main valve for controlling fuel flow to a combustion chamber and means for restraining the opening of the main valve means. Flame responsive means produces a signal to disable the restraining means when a flame is present. Means for starting combustion include electrically actuatable pilot valve means, ignition means and starting switch means operable only during a start sequence for connecting the pilot and ignition means and the flame responsive means to a power supply. Means are shown for bypassing the starting switch means in response to detection of a flame when the pilot is lit. Means are then utilized for opening the main valve means for normal operation after the restraining means has been disabled by the flame responsive means. Means responsive to failure of the power supply for connecting an alternative signal to maintain the restraining means disabled for a predetermined period after failure of the power supply means are shown herein. In the event of a power supply failure, the flame responsive means is deenergized thus interrupting the bypass circuit established above. Means are then utilized for reenergizing the flame responsive means in response to a power resumption during the predetermined period of restraining means disablement.

The reenergizing means may include means for bypassing the switching means during the predetermined period discussed. In the event that the flame responsive means includes an ultraviolet sensing system, it is possible that the components within the electronic circuitry associated therewith require resetting time in the case of the self-checking apparatus. In this instance the reenergizing means includes means for bypassing the switching means for all but a first portion of the predetermined period. That is, the reenergizing means includes means for delaying the reenergizing of the flame responsive means for a first portion of the predetermined period. Means are included for maintaining the bypass of the switching means for a second predetermined period after power is resumed thereby enabling the flame responsive means to become fully operable. The second predetermined period is the same length as or shorter than the first mentioned predetermined period. The apparatus may further include means for interrupting the bypass of the switching means after a third predetermined period. The third predetermined period is longer than the first mentioned predetermined period.

The invention advantageously further includes means for opening a normal signal circuit to the restraining means and closing a circuit for the alternative signal to the restraining means. Means may be utilized for opening the alternative signal circuit at the end of the predetermined period. Capacitor means are preferably connected across the restraining means to maintain the restraining means disabled during the transfer from the normal signal circuit to the alternative signal circuit. Means are also shown for reclosing the normal signal circuit in response to power resumption after the predetermined period has passed.

Other objects, advantages and features of this invention will become apparent when the following description is taken in conjunction with the accompanying drawings, in which:

FIGURE 1a is a schematic circuit diagram of control apparatus embodying the teachings of this invention; and FIGURE 1b is a continuation of the schematic circuit diagram of FIGURE 1a, the uppermost portion of FIGURE 1b being a continuation of the lowermost portion of FIGURE 1a; thus, in the preferred form of the invention, line 55 of FIGURE 1b is joined with line 49 of FIGURE 1a.

It will be noted in the circuit diagrams that numbered line diagrams have been utilized. The components can be readily located by reference to the line number where the component is positioned. Further, contact switching operations may be noted without designating a mechanical tie between the contact and the actuating means. The contacts may be located at any convenient position, even though quite remote from their actuating means. Cross reference between the actuating means and its associated contacts is easily accomplished by noting in the right-hand margin of the drawing the reference character of the actuating means, for example 3R, a relay coil, adjacent to line 32 in FIGURE 1a, the line in which contact actuating means 3R appears. Following the reference character there are noted the line numbers in which 3R contacts close or open when caused to do so by the actuating means, i.e. line numbers 37, 45, and 70. It will be further noted in the reference system used herein that back contacts, that is those that open when the actuating means is energized, are noted as underlined at their position following the reference character. For example, contacts 3R in line 37 are back contacts. Therefore the line number 37 following the 3R character reference in line 32 is underlined to note that contact 3R in line 37 is a back contact.

Other actuating means and their associated contacts are similarly noted. For example, the actuating coil of relay CR1 is positioned in line 70, FIGURE 1b. After the reference character designation CR1 in the right-hand margin of the drawing of FIGURE 1b, there are noted line numbers 38 and 58. This, as above, denotes CR1 contacts which will be operated in those lines upon actuation of the relay coil CR1 in line 70.

Referring to the drawings, the control apparatus for combustion equipment or the like which illustrates the present invention comprises main valve means MGV located in line 67 and includes means for restraining the opening of the main valve means MGV represented symbolically within the MGV circle. A flame detector 110 is shown in lines 83 and 89. For purposes of this schematic, the flame detector is assumed to be of the ultraviolet radiation sensing type. It has output terminals WH1 in line 85, BL in line 86, YL in line 87, and WH2 in line 88. An ultraviolet detector of this type is commercially available and the requirements herein may be satisfied by, for example, Model No. R4138A, sold by the Minneapolis-Honeywell Regulator Co. Relays 1R in line 40, 2R in line 47, 3R in line 32, and 4R in line 18 are part of the electronic circuitry associated with the ultraviolet detector 110 and are connected to the detector 110 at the BL terminals in line 23, the WH1 terminal in line 31, and the WH2 terminal in line 32. The YL terminal of detector 110 at line 87 is connected to chassis ground. In the starting system a pilot valve 100 in line 30, an "ignition on" lamp 101 in line 28, and an ignition transformer 102 in line 26 are included. An interlock delay unit 140 is shown in lines 57 to 63 and its function will be described hereinafter.

In normal operation the number one interlocks in line 12 are normally closed. The number one interlocks represents those that would drop out instantaneously upon power failure (starter contacts, relay contacts, etc.) or interlocks that are not critical for actual combustion (water pressure switch, etc.). Similarly the number two safety interlocks noted in lines 60 and 62 and designated with reference characters LPGS, HGPS, APS, and WPS represent interlocks which are critical for combustion, that is, air pressure switches, gas pressure switches, etc. These are normally closed. To start the cycle the main switch M1 is closed and then the start push button PB having contact closures PB1 in line 14, PB2 in line 30 and PB3 in line 49, is pushed closed. This start switching means is operable only during the starting sequence and is yieldingly biased open to provide this action. The closure of PB1 energizes relay 1M in line 14. 1M contacts in line 12 close energizing a blower to purge the combustion chamber of any collected volatiles. The closure of PB1 contacts also energizes time delay relay TD1 in line 15. Delay relay TD1 provides sufficient time for the blower in line 12 to purge the combustion chamber of all combustible materials and then effects closure of TD1 contacts in line 36. A circuit is thus established from power lead L1 through PB1 contacts in line 14, stop push button contacts in line 34, and TD1 contacts in line 36, through the primary winding of transformer T2 to power lead L2.

A first secondary of transformer T2 energizes relay 1R in line 40, through closed SS contacts of a safety switch in line 36, closed 2R contacts in line 39, closed 3R contacts in line 37, and through heater SSH in line 36. The heater SSH starts heating when the secondary of transformer T2 is energized and if a start is not effected within a predetermined period, for example, fifteen seconds, SS contacts in line 36 open to prevent starting of the apparatus until the difficulty is found.

Upon energization of relay 1R, contacts 1R close in line 38 providing a holding circuit for relay, 1R bypassing safety heater SSH. 1R contacts also close in line 30 enabling a circuit to be completed through start push button contacts PB2 in line 30 to the pilot valve 100 in line 30, and the ignition transformer 102 in line 26. An "ignition on" lamp 101 in line 28 lights at this time. The ignition transformer 102 ignites fuel issuing from the pilot valve 100 into the combustion chamber and a flame is established.

Outputs from the flame detector 110 at the terminals BL are received at line 23 to energize relay 4R. Transformer T1 in line 16 was energized with the closing of the main switches M1 in line 11. The arrangement and operation of the components in connection with the vacuum tubes VC1 and VC2 will not be described in detail here since they are not part of this invention. It will suffice to say, that in a commercially available model of the type suitable for use here, that in connection with an oscillating shutter arrangement a self-checking feature is derived in which relay 4R is alternately energized and de-energized at the rate of approximately ninety times a minute. Therefore back contacts 4R in lines 31 and 41 and front contacts in line 43 open and close at the rate of approximately ninety times a minute. The opening and closing of contacts 4R in lines 41 and 43 is operative to build up a charge on capacitors in lines 40, 42 and 45 from rectifier bridge 120. When a sufficient build-up is acquired, relay 2R in line 47 is energized. The energization of relay 2R closes front contacts 2R in line 32 to energize relay 3R and opens back contacts 2R in line 39 to disable the circuit to the heater SSH, and to prevent a shutdown from overheating.

The energization of relay 3R in line 32 opens back contacts 3R in line 37 to insure the disabling of the heater SSH. Contacts 3R close in line 45 to complete a circuit through the number two interlocks in lines 60 and 62 to energize or disable the latching means of the main gas valve MGV in line 67. The main gas valve MGV may now be opened manually and full combustion established in the combustion chamber. Microswitch MS1 operatively connected to the latching mechanism in line 66 closes contacts MS1 in line 34 to complete the circuit around TD1 contacts in line 36 and insure continuous operation after the start button is released. In one embodiment the microswitch MS1 is mechanically linked to the MS1 contacts in 34.

Contacts 3R also close in line 70 to energize relays CR1 and CR2 in lines 70 and 72. Front contacts CR1 close in line 38 to complete a bypass circuit around the PB1 contacts to provide for continuous running of the combustion apparatus. CR1 contacts also close in line 58 to energize ID relay in line 58 in the interlock delay unit 140.

The energization of the ID relay closes contacts ID in line 60 to complete the normal signal circuit for the main gas valve MGV in line 67. Back contacts ID open in line 61 to remove an alternative signal supply from the main gas valve MGV that is connected to terminals 3 and 5 of the interlock delay unit 140.

The push button PB1 may now be released since the "flame on" lamp 130 is now illuminated in line 49 after closure of 3R contacts in line 45. PB1 contacts open in line 14 with no effect since they are bypassed by CR1 contacts in line 38. PB2 contacts in line 30 open to deenergize the ignition transformer 102, the "ignition on" lamp 101 and the solenoid operated pilot valve 100. Push button PB3 contacts open in line 49 to remove a bypass circuit around a number two interlock LPGS which may be utilized to denote a low gas pressure and is not necessary for a starting sequence. It will be noted that the LPGS interlock stays in the interlock circuit with the main gas valve MGV and would shut down the combustion equipment if the gas pressure became too low to sustain flame. The equipment may be shut down by pushing the stop button in line 34 which interrupts the circuit to the interlocks and to the main gas valve which would cause the main gas valve MGV to close.

In the event of a prolonged power failure, the transformers T1 and T2 would be deenergized and the valves closed to shut down the apparatus. This is desirable. However in the event of nuisance power failures the equipment is also shut down and this is not desirable if the nuisance power failures are of a length no longer than, for example, seven seconds. To prevent this shutdown situation from nuisance power failures, an interlock delay unit 140 located in lines 57 to 63 has been provided. When a power failure occurs, relay 3R drops out, opening contacts 3R in line 70 to deenergize relay CR1. CR1 contacts in line 38 then open to interrupt the bypass circuit established around PB1 contacts. CR1 contacts also open in line 58 to deenergize relay ID in the interlock delay unit 140. ID contacts in line 60 open disconnecting the normal signal circuit for the main gas valve MGV and ID back contacts in line 61 close connecting an alternative signal circuit to the main gas valve MGV. That is, the closure of the ID contacts in line 61 may connect a battery or some other suitable signal source between terminals 3 and 5 of the interlock delay unit 140, through the number two interlocks in lines 60 and 62 and through the main gas valve MGV in line 67. A maintaining capacitor MC connected between terminals 4 and 5 and thus across main gas valve MGV is operative to maintain the restraining means disabled during the transfer between the normal signal circuit and the alternative signal circuit.

Without further circuitry the interlock delay unit would continue to provide a signal to maintain the restraining means disabled until time delay relay TD in line 59 timed out and opened front contacts TD in line 61 to disable the alternative signal circuit. The TD relay in line 59 may be set to time out for example in seven seconds. A complete shutdown would thus be effected and a complete restarting sequence would be necessary. However, as stated hereinbefore, it is desirable to avoid shutdowns from nuisance power failures so means have been provided for reenergizing the flame responsive means in response to power resumption during a predetermined period of, for example, seven seconds.

While the time of the predetermined period of alternative signal application to MGV is running, the main gas valve remains open and a flame continues within the combustion chamber.

The most efficient means for re-energizing the flame responsive means in response to power resumption during the predetermined period is to bypass the PB1 contacts in line 14. This is accomplished by the CR4, CR3, and CR2 contacts in series in line 40.

The CR2 relay is located in line 72 and is energized by closure of 3R contacts in line 70. Upon opening of the 3R contacts in line 70, the CR2 relay is not deenergized immediately but is instead deenergized after a delay determined by the RC network associated therewith. The relay may be a 110 volt D.C. unit so a rectifier SD1 in line 72 is utilized as a half-wave rectifier and the CR2 relay may be connected across the power leads L1 and L2. R1 is a current limiting resistor to prevent damage to the diode rectifier SD1 from the inrush of current to the capacitor C1. The capacitor C1 may be a 220 microfarad capacitor rated for 150 volts. The adjustable resistor R2 will adjust the time of delay and release the CR2 relay, with the components noted hereinbefore, from one and one-half to three seconds after power failure. Contacts CR2 in line 40 are back contacts and are thus normally closed until power is applied to power lines L1 and L2. Back contacts CR2 thus then open in response to the energization of relay CR2. Upon the loss of power to leads L1 and L2, CR2 contacts will open after a delay of, for example, two seconds. Therefore, back contacts CR2 in line 40 prevent the re-energization of the flame responsive means through the bypass circuit for approximately two seconds. This contact is not necessary unless it is being used with self-checking apparatus such as described herein, since the components within the self-checking circuitry need time for resetting and realignment. If a flame rod detector is used, for example, the CR2 contacts may be dispensed with.

Relay CR3 is located in line 75 and is energized by the closure of TD2 contacts. TD2 contacts are closed by time delay relay TD2 located in line 90. The time delay relay TD2 may be a mechanical, adjustable reset timer which may be set for any length of time, for example five seconds. The TD2 contacts close at the end of the preset interval after power is applied to leads L1 and L2, and open almost at once when the power is shut off. Thus the relay CR3 is energized only after five seconds have elapsed after power is applied to the leads L1 and L2, whether the power is applied in the normal circumstances of starting the equipment up or whether power is resumed or reapplied after a nuisance power failure.

Relay CR4 is located in line 80. It is energized via a transformer T3 connected to leads L1 and L2. Relay CR4 is connected in a long period timing circuit where, for example, twelve seconds is required. The transformer T3 may be a 24 volt transformer to reduce the voltage to a suitable level for capacitor C2. R3 is a current limiting resistor and also serves to drop the voltage slightly to hold the D.C. voltage within the rating of the capacitor C2. Resistors R4 and R5 are in series and are used to control the length of time relay CR4 will hold in. Resistor R4 is fixed and is used to prevent an excessive load on the silicon diode SD2 and to prevent the possibility of adjustable resistor R5 being set so that relay CR4 will never pull in. By proper choice of resistors, times from four seconds to 200 seconds are possible but the time chosen for this example will be twelve seconds.

Referring again to the serially connected CR4, CR3 and CR2 contacts in line 40, we see that back contacts CR2 are operative to prevent the reapplication of power to or the re-energization of the flame responsive circuit for two seconds after the power failure whether the power is resumed or not. Back contacts CR3 will open in response to the power failure and will close five seconds after the power is resumed. Front contacts CR4 in line 40 will open after the twelve second time delay. Thus we can see that the bypass circuit just described in line 40 will not bypass the push button PB1 for two seconds after the power failure. If power is resumed at any time up to seven seconds after power failure the CR3 contacts will close for five seconds to attempt to apply power to the flame responsive circuit. This will provide ample time for the flame responsive circuit to become operable again and close its various contacts to resume normal operation of the system. The application of the bypass circuit in line 40 is limited to twelve seconds at most since the CR4 contact will open at the end of twelve seconds and thus prevent the re-energization of the flame responsive unit until a complete restart sequence is gone through.

To insure that the interlock delay unit 140 continues to maintain an alternative signal during a restart period to the main gas valve MGV, contacts CR4 in line 56, contacts CR3 in line 57, and contacts CR1 in line 58 are connected in parallel between the power lead L1 and the interlock delay unit 140. The CR1 contacts open on power failure and will close only after the flame relay 3R has been reenergized thus closing 3R contacts in line 72 to reenergize CR1. This would indicate that the flame responsive unit in again operative and that the alternative signal circuit may be removed. Thus the interlock delay unit 140 may receive power from leads L1 and L2 energizing relay ID to transfer the normal signal circuit back into connection with the main gas valve MGV.

Contacts CR3 in line 57 open on power failure and close five seconds after the power comes on. This insures that a five second period is provided to give the flame responsive sensor unit plenty of time to become operable again. If the flame responsive unit is not operable at this time, CR3 contacts will close and the interlock delay unit 140 may be deenergized if power is again available on leads L1 and L2. In any event contacts CR4 are back contacts in line 56 which open upon power failure and close after twelve seconds. If the system is not in normal operation by this time, it is desirable to shut the system down completely and go through the restarting sequence to find the difficulties.

To summarize the operation of the above contacts, CR1 contacts in line 38 have been provided for delaying the reenergizing of a flame responsive means for a first portion of the predetermined period of seven seconds set forth herein. CR3 contacts in line 40 are closed for five seconds after power resumes and thus provides means for maintaining the bypass of the push button switching means for a second predetermined period after power is resumed thereby enabling the flame responsive means to become fully operable. It is to be noted that the second predetermined period, in this instance five seconds, is the same length as or shorter than the first mentioned predetermined period which has been set in this example as seven seconds. CR4 contacts in line 40, which open after twelve seconds delay, provide means for interrupting the bypass of the push button switching means after a third predetermined period. The third predetermined period is longer than the first mentioned predetermined period, the respective lengths in the example set forth herein being twelve seconds and seven seconds.

The ID contacts in lines 60 and 61 provide means for opening a normal signal circuit to the restraining means of the main gas valve and closing a circuit for the alternative signal to the restraining means. The TD contact in line 61 insures that the alternative signal circuit will open at the end of the predetermined period of seven seconds. The ID contacts in lines 60 and 61 and the CR4 contacts in line 56 cooperate to provide means for reclosing the normal signal circuit in response to power resumption after the predetermined period of seven seconds.

There has thus been described control apparatus for combustion equipment or the like which includes means for safely keeping the combustion equipment operating through its interlocks during nuisance power failures without a complete shutdown of the equipment necessitating a complete restarting sequence, or without sacrificing any safety details.

In conclusion, it is to be noted that the embodiments disclosed and described herein are meant to be illustrative only and not limiting in any sense. The embodiments described serve merely to illustrate the spirit and scope of the invention.

We claim:

1. Control apparatus for combustion equipment or the like comprising main valve means for controlling fuel flow to a combustion chamber; means for restraining the opening of said main valve means; means responsive to a flame in said combustion chamber for producing a signal to disable said restraining means when a flame is present and for closing said main valve means when a flame is absent; starting sequence means including switching means and ignition means; said switching means being operable to connect a power supply means to said ignition means and said flame responsive means; and means responsive to failure of the power supply means for connecting an alternative signal to maintain said restraining means disabled for a predetermined period after failure of the power supply.

2. Apparatus as defined in claim 1 which further includes means for reenergizing said flame responsive means in response to power resumption during said predetermined period.

3. Apparatus as defined in claim 2 in which said reenergizing means includes means for bypassing said switching means for all but a first portion of said predetermined period.

4. Apparatus as defined in claim 2 in which said reenergizing means includes means for bypassing said switching means during said predetermined period.

5. Apparatus as defined in claim 4 in which said reenergizing means includes means for delaying the reenergizing of said flame responsive means for a first portion of said predetermined period.

6. Apparatus as defined in claim 4 which further includes means for maintaining said bypass of said switching means for a second predetermined period after power is resumed thereby enabling said flame responsive means to become fully operable, said second predetermined period being the same length as or shorter than said first-mentioned predetermined period.

7. Apparatus as defined in claim 6 which further includes means for interrupting said bypass of said switching means after a third predetermined period, said third predetermined period being longer than said first-mentioned predetermined period.

8. Apparatus as defined in claim 1 which further includes means for opening a normal signal circuit to said restraining means and closing a circuit for said alternative signal to said restraining means in response to a power failure.

9. Apparatus as defined in claim 8 which further includes means for opening said alternative signal circuit at the end of said predetermined period.

10. Apparatus as defined in claim 8 which further includes capacitor means connected across said restraining means to maintain said restraining means disabled during the transfer from said normal signal circuit to said alternative signal circuit.

11. Apparatus as defined in claim 9 which further includes means for reclosing said normal signal circuit in response to power resumption after said predetermined period.

12. Control apparatus for combustion equipment and the like comprising main valve means for controlling fuel flow to a combustion chamber; means for restraining the opening of said main valve means; means responsive to a flame in said combustion chamber for producing a signal to disable said restraining means when a flame is present and for closing said main valve means when a flame is absent; means for starting combustion including electrically actuatable pilot valve means, ignition means, and starting switch means operable only during a start sequence for connecting said pilot and ignition means and said flame responsive means to a power supply; means for bypassing said starting switch means to said flame responsive means in response to detection of a flame; means for opening said main valve means for normal operation after said restraining means has been disabled; means responsive to failure of the power supply for connecting an alternative signal to maintain said restraining means disabled for a predetermined period after failure of the power supply; said flame responsive means being deenergized on power failure causing interruption of said bypass circuit; and means for reenergizing said flame responsive means in response to power resumption during said predetermined period.

13. Apparatus as defined in claim 12 in which said reenergizing means includes means for establishing a second bypass around said switch means to said flame responsive means during said predetermined period.

14. Apparatus as defined in claim 13 in which said reenergizing means includes means for delaying the reenergization of said flame responsive means for a first portion of said predetermined period.

15. Apparatus as defined in claim 13 which further includes means for maintaining said second bypass for a second predetermined period after power is resumed thereby affording said flame responsive means time to become fully operable.

16. Apparatus as defined in claim 15 which further includes means for interrupting said second bypass after a third predetermined period.

17. Apparatus as defined in claim 12 which further includes means for switching between a normal signal circuit to said restraining means and a circuit for said alternative signal in response to a power failure.

18. Apparatus as defined in claim 17 which further includes means for opening said alternative signal circuit at the end of said predetermined period.

19. Apparatus as defined in claim 18 which further includes means for switching back to said normal signal circuit in response to power resumption after said predetermined period.

References Cited by the Examiner
UNITED STATES PATENTS

| | | | |
|---|---|---|---|
| 1,727,735 | 9/1929 | Taylor | 158—28 |
| 2,120,053 | 6/1938 | Fehrenbach | 158—28 |
| 2,727,568 | 12/1955 | Smith | 158—28 |

JAMES W. WESTHAVER, *Primary Examiner.*